United States Patent
Hong

(10) Patent No.: US 11,470,539 B2
(45) Date of Patent: Oct. 11, 2022

(54) METHOD AND DEVICE FOR CONTROLLING MOBILE TERMINAL TO USE NETWORK, BASE STATION, AND USER EQUIPMENT

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 154 days.

(21) Appl. No.: 16/765,815

(22) PCT Filed: Nov. 29, 2017

(86) PCT No.: PCT/CN2017/113624
§ 371 (c)(1),
(2) Date: May 20, 2020

(87) PCT Pub. No.: WO2019/104542
PCT Pub. Date: Jun. 6, 2019

(65) Prior Publication Data
US 2020/0288376 A1      Sep. 10, 2020

(51) Int. Cl.
*H04W 48/04*     (2009.01)
*H04W 76/30*     (2018.01)
*H04W 74/08*     (2009.01)

(52) U.S. Cl.
CPC ....... *H04W 48/04* (2013.01); *H04W 74/0833* (2013.01); *H04W 76/30* (2018.02)

(58) Field of Classification Search
CPC . H04W 24/10; H04W 76/30; H04W 74/0833; H04W 76/34; H04W 48/04
See application file for complete search history.

(56) References Cited

U.S. PATENT DOCUMENTS

| | | | |
|---|---|---|---|
| 8,290,495 B2 | 10/2012 | Park | |
| 2010/0103889 A1* | 4/2010 | Kim | H04W 74/0866 370/328 |
| 2010/0216406 A1 | 8/2010 | Park | |
| 2014/0003263 A1 | 1/2014 | Sheriff | |
| 2015/0141019 A1* | 5/2015 | Bengtsson | H04W 36/22 455/440 |

(Continued)

FOREIGN PATENT DOCUMENTS

| | | |
|---|---|---|
| CN | 101409928 A | 4/2009 |
| CN | 102647766 A | 8/2012 |

(Continued)

OTHER PUBLICATIONS

First Office Action of the Chinese application No. 201780002124.5, dated Sep. 1, 2020.

(Continued)

*Primary Examiner* — Anez C Ebrahim
(74) *Attorney, Agent, or Firm* — Syncoda LLC; Feng Ma

(57) ABSTRACT

A method for controlling a mobile terminal to use a network includes: receiving moving speed reported by the mobile terminal; if the moving speed is higher than or equal to a speed threshold, allowing the mobile terminal to use a current dedicated network; and if the moving speed is lower than the speed threshold, refusing the mobile terminal to use the current dedicated network.

18 Claims, 13 Drawing Sheets

(56) References Cited

U.S. PATENT DOCUMENTS

2018/0199221 A1\* 7/2018 Lin ..................... H04L 47/822
2018/0241463 A1\* 8/2018 Lu ........................ H04W 36/32

FOREIGN PATENT DOCUMENTS

| CN | 102938917 A | 2/2013 |
| CN | 104080127 A | 10/2014 |
| CN | 105407477 A | 3/2016 |
| CN | 105517077 A | 4/2016 |

OTHER PUBLICATIONS

International Search Report in the international application No. PCT/CN2017/113624, dated Aug. 13, 2018.
English translation of the Written Opinion of the International Search Authority in the international application No. PCT/CN2017/113624, dated Aug. 13, 2018.
Second Office Action of the Chinese application No. 201780002124.5, dated Apr. 2, 2021.

\* cited by examiner

METHOD AND DEVICE FOR CONTROLLING MOBILE TERMINAL TO USE NETWORK, BASE STATION, AND USER EQUIPMENT

CROSS-REFERENCE TO RELATED APPLICATIONS

The present application is a national stage of International Application No. PCT/CN2017/113624 filed on Nov. 29, 2017, the disclosure of which is hereby incorporated by reference in its entirety.

TECHNICAL FIELD

The disclosure relates to the technical field of communication, and in particular, to a method and device for controlling a mobile terminal to use a network, a method and device for reporting information, a base station, user equipment and a computer readable storage medium.

BACKGROUND

With the rapid development of high-speed railway technologies and the rapid deployment and opening of high-speed railways, more and more people will choose high-speed railway travel. In order to meet the communication needs of mobile users taking high-speed railways and ensure communication quality, carriers choose to deploy a high-speed-railway dedicated network in an attempt to exclusively serve the mobile users taking high-speed railways.

There is a great difference between the high-speed-railway dedicated network and a general public Long Term Evolution (LTE) network. In the high-speed-railway dedicated network, a plurality of Radio Remote Units (RRU) are cascaded together as a cell to serve the mobile users taking high-speed railways.

According to the frequency resource conditions of different regions, the high-speed-railway dedicated network and the general public LTE network may use the same frequency or different frequencies. In an actual network, as the high-speed-railway dedicated network usually has better coverage, user equipment not on high-speed railways may often access the high-speed-railway dedicated network, especially in urban areas with a large population, which tends to cause congestion of the high-speed-railway dedicated network, thus affecting the communication quality of the mobile users on high-speed railways.

SUMMARY

In view of this, the present disclosure provides a method and device for controlling a mobile terminal to use a network, a method and device for reporting information, a base station, user equipment and a computer readable storage medium, so as to avoid the situation that the communication quality of a mobile terminal in high-speed-railway is influenced due to the access of a general mobile terminal to a high-speed-railway dedicated network.

According to a first aspect of the embodiments of the disclosure, there in provided a method for controlling a mobile terminal to use a network, which is applied to a base station, the method including:

receiving a moving speed reported by the mobile terminal;

when the moving speed is higher than or equal to a speed threshold, allowing the mobile terminal to use a current dedicated network; and when the moving speed is lower than the speed threshold, refusing the mobile terminal to use the current dedicated network.

In one embodiment, when the reported moving speed is carried in a third message in a random access procedure, allowing the mobile terminal to use the current dedicated network may include:

permitting the mobile terminal to access the current dedicated network through a fourth message in the random access procedure.

In one embodiment, when the reported moving speed is carried in a fifth message in a random access procedure, allowing the mobile terminal to use the current dedicated network may include:

allowing the mobile terminal to continue to use the current dedicated network.

In one embodiment, when the reported moving speed is carried in a third message in a random access procedure, refusing the mobile terminal to use the current dedicated network may include:

refusing the mobile terminal to access the current dedicated network through a fourth message in the random access procedure.

In one embodiment, when the reported moving speed is carried in a fifth message in a random access procedure, refusing the mobile terminal to use the current dedicated network may include:

releasing a connection with the mobile terminal through radio resource control (RRC) connection release signaling; or notifying the mobile terminal of accessible public network information through the RRC connection release signaling.

According to a second aspect of the embodiments of the disclosure, there is provided a method for reporting information, which is applied to a mobile terminal, the method including:

determining that the mobile terminal needs to access a current dedicated network; and reporting a moving speed of the mobile terminal to a base station of the current dedicated network, such that the base station can allow or refuse the mobile terminal to use the current dedicated network.

In one embodiment, the method may further include:

determining the moving speed of the mobile terminal before reporting the moving speed of the mobile terminal to the base station of the current dedicated network.

In one embodiment, reporting the moving speed of the mobile terminal to the base station of the current dedicated network may include:

reporting the moving speed to the base station of the current dedicated network through a third message in a random access procedure or a fifth message in the random access procedure.

According to a third aspect of the embodiments of the disclosure, there is provided a device for controlling a mobile terminal to use a network, which is applied to a base station, the device including:

a receiving module configured to receive a moving speed reported by the mobile terminal;

an allowing module configured to allow the mobile terminal to use the current dedicated network when the moving speed received by the receiving module is higher than or equal to a speed threshold; and a refusing module configured to refuse the mobile terminal to use the current dedicated network when the moving speed received by the receiving module is lower than the speed threshold.

In one embodiment, when the reported moving speed is carried in a third message in a random access procedure, the allowing module may include:

a first allowing unit configured to permit the mobile terminal to access the current dedicated network through a fourth message in the random access procedure.

In one embodiment, when the reported moving speed is carried in a fifth message in a random access procedure, the allowing module may include:

a second allowing unit configured to allow the mobile terminal to continue to use the current dedicated network.

In one embodiment, when the reported moving speed is carried in a third message in a random access procedure, the refusing module may include:

an access refusing unit configured to refuse the mobile terminal to access the current dedicated network through a fourth message in the random access procedure.

In one embodiment, when the reported moving speed is carried in a fifth message in a random access procedure, the refusing module may include:

a connection releasing unit configured to release a connection with the mobile terminal through RRC connection release signaling; or a notification unit configured to notify the mobile terminal of accessible public network information through the RRC connection release signaling.

According to a fourth aspect of the embodiments of the disclosure, there is provided a device for reporting information, which is applied to a mobile terminal, the device including:

a first determining module configured to determine that the mobile terminal needs to access a current dedicated network; and a reporting module configured to report, after the first determining module determines that the mobile terminal needs to access the current dedicated network, a moving speed of the mobile terminal to a base station of the current dedicated network, such that the base station allows or refuses the mobile terminal to use the current dedicated network.

In one embodiment, the device may further include:

a second determining module configured to determine the moving speed of the mobile terminal before the reporting module reports the moving speed of the mobile terminal to the base station of the current dedicated network.

In one embodiment, the reporting module may be configured to:

report the moving speed to the base station of the current dedicated network through a third message in a random access procedure or a fifth message in the random access procedure.

According to a fifth aspect of the embodiments of the disclosure, there is provided a base station, including:

a processor; and
a memory for storing processor-executable instructions;
wherein the processor is configured to:
receive a moving speed reported by a mobile terminal;
when the moving speed is higher than or equal to a speed threshold, allow the mobile terminal to use a current dedicated network; and
when the moving speed is lower than the speed threshold, refuse the mobile terminal to use the current dedicated network.

According to a sixth aspect of the embodiments of the disclosure, there is provided user equipment, including:

a processor; and
a memory for storing processor-executable instructions;
wherein the processor is configured to:
determine that the mobile terminal needs to access a current dedicated network; and
report a moving speed of a mobile terminal to a base station of the current dedicated network, such that the base station allows or refuses the mobile terminal to use the current dedicated network.

According to a seventh aspect of the embodiments of the disclosure, there is provided a computer readable storage medium, which has stored thereon computer instructions which, when executed by a processor, implement the steps of the above-described method for controlling the mobile terminal to use the network.

According to an eighth aspect of the embodiments of the disclosure, there is provided a computer readable storage medium, which has stored thereon computer instructions which, when executed by a processor, implement the steps of the above-described method for reporting information.

The technical solutions provided by the embodiments of the disclosure may have the following beneficial effects:

By receiving the moving speed reported by the mobile terminal, and comparing the moving speed with the speed threshold, the dedicated network can determine, according to the comparison result, whether the mobile terminal is a high-speed-railway mobile terminal or a general mobile terminal in an initial access phase of the mobile terminal, such that the mobile terminal accessing the dedicated network can be better managed, which avoids the situation that the communication quality of the high-speed-railway mobile terminal is influenced due to the fact that the general mobile terminal accesses the high-speed-railway dedicated network.

By reporting the moving speed to the base station when it is determined that access to the current dedicated network is required, the base station can compare the moving speed with the speed threshold and determine whether the mobile terminal is a high-speed-railway mobile terminal or a general mobile terminal according to a comparison result, such that the mobile terminal accessing the base station can be better managed, which avoids the situation that the communication quality of the high-speed-railway mobile terminal is influenced due to the fact that the general mobile terminal accesses the high-speed-railway dedicated network.

It is to be understood that the above general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail herein, examples of which are shown in the accompanying drawings. When the following description refers to the drawings, unless otherwise indicated, the same numbers in different drawings indicate the same or similar elements. The implementation models described in the following exemplary embodiments do not represent all implementation models consistent with the disclosure. On the contrary, they are merely examples of devices and methods consistent with some aspects of the disclosure as detailed in the appended claims.

Figure 1:
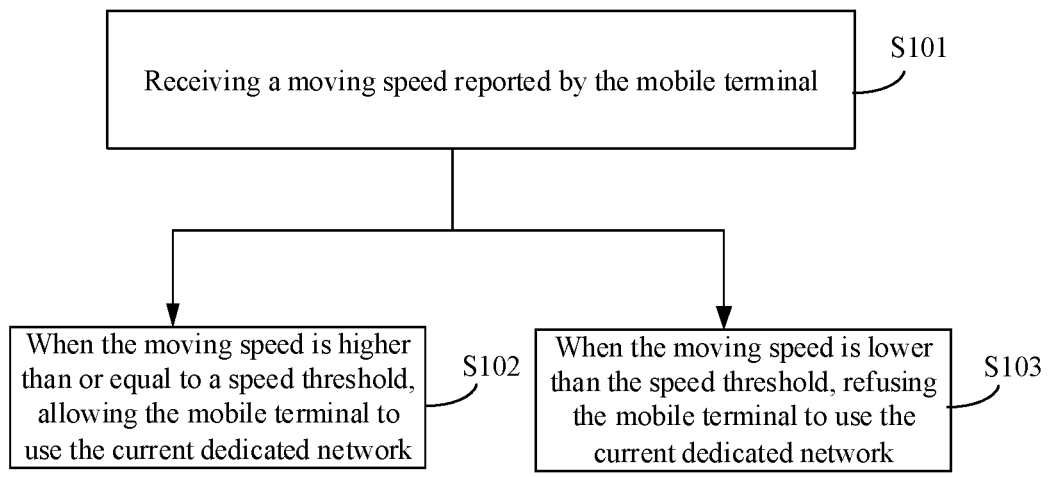
FIG. 1 is a flowchart of a method for controlling a mobile terminal to use a network according to an exemplary embodiment of the present disclosure.

FIG. 1 is a flowchart of a method for controlling a mobile terminal to use a network according to an exemplary embodiment of the present disclosure. The embodiment is described from a base station side. As illustrated in FIG. 1, the method for controlling the mobile terminal to use the network includes the following steps.

In S101, a moving speed reported by the mobile terminal is received.

When the mobile terminal needs to access a dedicated network, for example, a high-speed-railway dedicated network, the mobile terminal may report its own moving speed in a random access procedure, for example, the mobile terminal may report the moving speed in a third message (MSG3) or a fifth message (MSG5).

In S102, if the moving speed is higher than or equal to a speed threshold, the mobile terminal is allowed to use a current dedicated network.

The above speed threshold can be configured by an Operation Administration and Maintenance (OAM) system.

In the embodiment, if the moving speed reported by the mobile terminal is carried in the MSG3 in the random access procedure, a base station determines, after receiving the MSG3, whether the moving speed reported by the mobile terminal is higher than the speed threshold. If the moving speed of the mobile terminal is higher than or equal to the speed threshold, the access of the mobile terminal to the current dedicated network can be permitted through a fourth message (MSG4) in the random access procedure. If the moving speed reported by the mobile terminal is carried in the MSG5 in the random access procedure, it indicates that the base station has permitted the access of the mobile terminal in the initial access phase. If the moving speed of the mobile terminal is higher than or equal to the speed threshold, the mobile terminal is allowed to continue to use the current dedicated network.

In the present embodiment, the base station allows the mobile terminal to use the current dedicated network in different ways by receiving the moving speed of the mobile terminal carried in different messages in the random access procedure, and implementation is flexible.

In S103, if the moving speed is lower than the speed threshold, the mobile terminal is refused to use the current dedicated network.

In the embodiment, if the moving speed reported by the mobile terminal is carried in the MSG3 in the random access procedure, the base station determines, after receiving the MSG3, whether the moving speed reported by the mobile terminal is higher than the speed threshold. If the moving speed of the mobile terminal is lower than the speed threshold, the access of the mobile terminal to the current dedicated network can be refused through the MSG4 in the random access procedure. If the moving speed reported by the mobile terminal is carried in the MSG5 in the random access procedure, it indicates that the base station has permitted the access of the mobile terminal in the initial access phase. If the moving speed of the mobile terminal is lower than the speed threshold, the connection with the mobile terminal can be released through RRC Connection Release signaling, or the mobile terminal can be notified of accessible public network information through RRC Connection Release for reference by the mobile terminal.

In the embodiment, the base station refuses the access of the mobile terminal to the current dedicated network in different ways by receiving the moving speed of the mobile terminal carried in different messages in the random access procedure, and implementation is flexible.

According to the above embodiment, by receiving the moving speed reported by the mobile terminal, and comparing the moving speed with the speed threshold, the dedicated network can determine, according to the comparison result, whether the mobile terminal is a high-speed-railway mobile terminal or a general mobile terminal in an initial access phase of the mobile terminal, such that the mobile terminal accessing the dedicated network can be better managed, which avoids the situation that the communication quality of the high-speed-railway mobile terminal is influenced due to the fact that the general mobile terminal accesses the high-speed-railway dedicated network.

Figure 2:
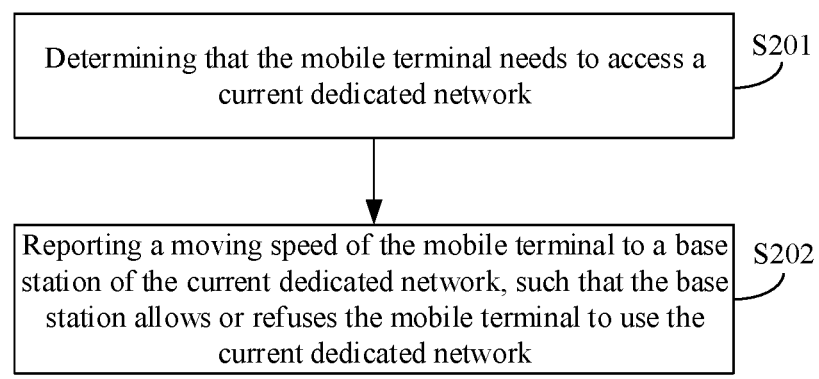
FIG. 2 is a flowchart of a method for reporting information according to an exemplary embodiment of the present disclosure.

FIG. 2 is a flowchart of a method for reporting information according to an exemplary embodiment of the present disclosure. The embodiment is described from a mobile terminal side. As illustrated in FIG. 2, the method includes the following steps.

In S201, it is determined that the mobile terminal needs to access a current dedicated network.

In S202, a moving speed of a mobile terminal is reported to a base station of the current dedicated network, such that the base station allows or refuses the mobile terminal to use the current dedicated network.

In the embodiment, when the mobile terminal needs to access a dedicated network, for example, a high-speed-railway dedicated network, the mobile terminal may report its own moving speed in a random access procedure, for example, it may report its own moving speed in a third message (MSG3) or a fifth message (MSG5). After receiving the reported moving speed, the base station can compare the moving speed with a speed threshold, and allows the access of the mobile terminal to the current dedicated network when the moving speed is higher than or equal to the speed threshold, and refuses the access of the mobile terminal to the current dedicated network when the moving speed is lower than the speed threshold.

According to the above embodiment, by reporting the moving speed to the base station when it is determined that the mobile terminal needs to access the current dedicated network, the base station can compare the moving speed with the speed threshold and determine whether the mobile terminal is a high-speed-railway mobile terminal or a general mobile terminal according to a comparison result, such that the mobile terminal accessing the base station can be better managed, which avoids the situation that the communication quality of the high-speed-railway mobile terminal is influenced due to the fact that the general mobile terminal accesses the high-speed-railway dedicated network.

Figure 3:
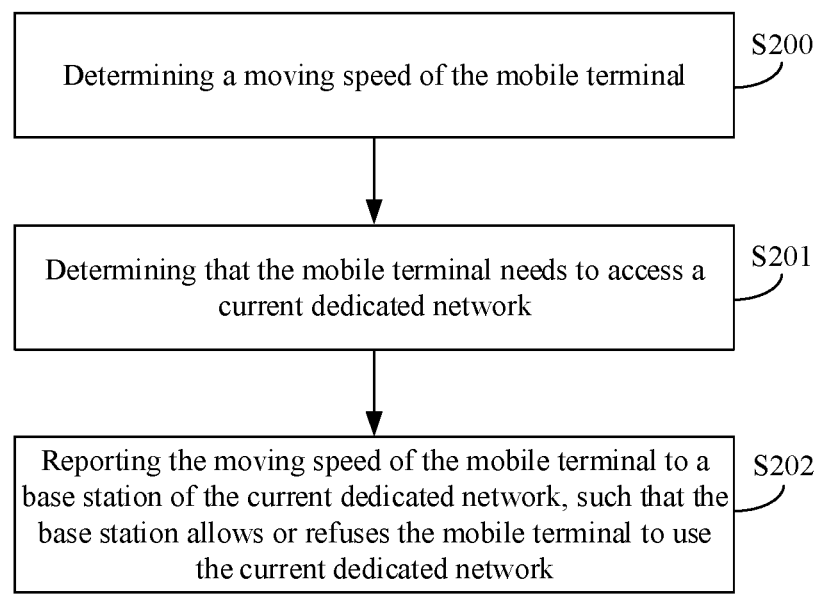
FIG. 3 is a flowchart of another method for reporting information according to an exemplary embodiment of the present disclosure.

FIG. 3 is a flowchart of another method for reporting information according to an exemplary embodiment of the present disclosure. As illustrated in FIG. 3, before S201, the method may further include the following step.

In S200, the moving speed of the mobile terminal is determined.

Alternatively, S200 may also be after S201 and before S202.

Before accessing a dedicated network, for example, a high-speed-railway dedicated network, the mobile terminal needs to determine its own moving speed.

The moving speed of the mobile terminal may be obtained by GPS and other methods. The moving distance of the mobile terminal within a certain time period is measured, and the moving speed of the mobile terminal can be obtained by dividing the moving distance by the time period.

According to the above embodiment, by determining the moving speed of the mobile terminal, conditions are provided for subsequently report the moving speed of the mobile terminal to the base station.

Figure 4:
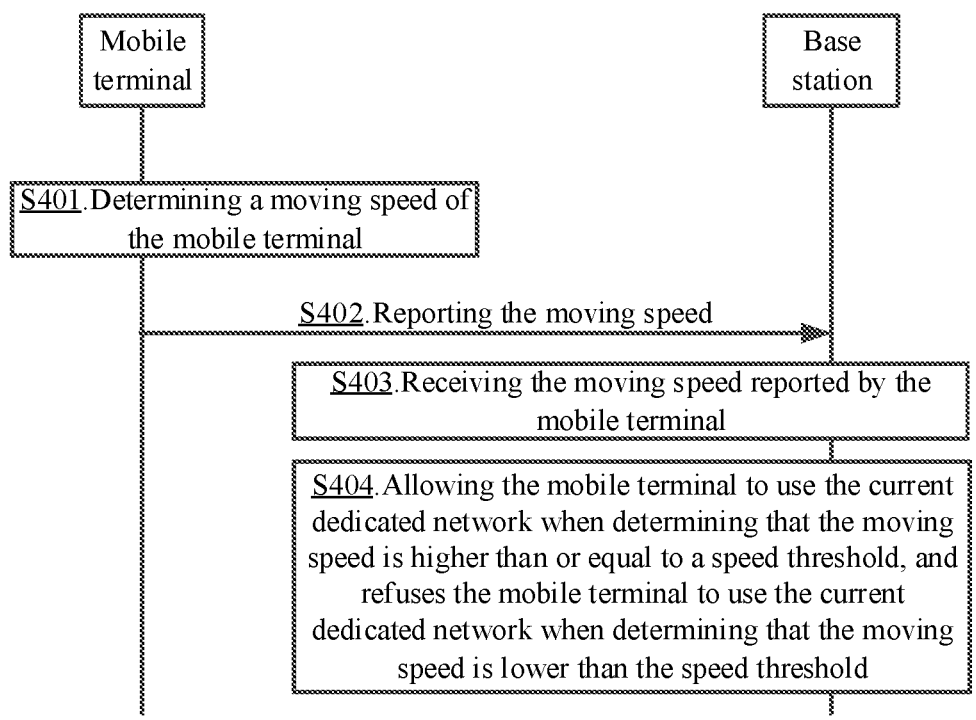
FIG. 4 is a signaling flowchart of a method for controlling a mobile terminal to use a network according to an exemplary embodiment of the present disclosure.

FIG. 4 is a signaling flowchart of a method for controlling a mobile terminal to use a network according to an exemplary embodiment of the present disclosure. The embodiment is described from the perspective of interaction between the mobile terminal and a base station of a high-speed-railway dedicated network. As illustrated in FIG. 4, the method includes the following steps.

In S401, the mobile terminal determines the moving speed of the mobile terminal.

In S402, after determining that the mobile terminal needs to access a current dedicated network, the mobile terminal reports the moving speed to the base station of the high-speed-railway dedicated network.

In S403, the base station receives the moving speed reported by the mobile terminal.

In S404, the base station allows the mobile terminal to use the current dedicated network when determining that the moving speed is higher than or equal to a speed threshold, and refuses the mobile terminal to use the current dedicated network when determining that the moving speed is lower than the speed threshold.

According to the above embodiment, through the interaction between the mobile terminal and the base station, the base station can compare the moving speed reported by the mobile terminal with the speed threshold. The base station determines, according to a comparison result, whether the mobile terminal is a high-speed-railway mobile terminal or a general mobile terminal in an initial access phase of the mobile terminal, such that the mobile terminal accessing the base station can be better managed, which avoids the situation that the communication quality of the high-speed-railway mobile terminal is influenced due to the fact that the general mobile terminal accesses the high-speed-railway dedicated network.

Figure 5:
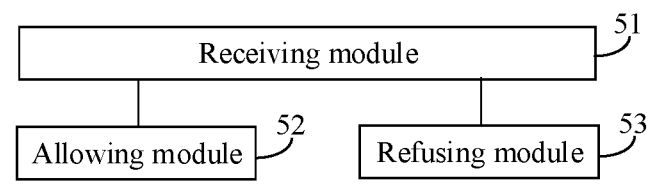
FIG. 5 is a block diagram of a device for controlling a mobile terminal to use a network according to an exemplary embodiment.

FIG. 5 is a block diagram of a device for controlling a mobile terminal to use a network according to an exemplary embodiment. The device is located in a base station, and as illustrated in FIG. 5, the device includes a receiving module 51, an allowing module 52 and a refusing module 53.

The receiving module 51 is configured to receive a moving speed reported by the mobile terminal.

When the mobile terminal needs to access a dedicated network, for example, a high-speed-railway dedicated network, the mobile terminal may report its own moving speed in a random access procedure. For example, the mobile terminal may report its own moving speed in a third message (MSG3) or a fifth message (MSG5).

The allowing module 52 is configured to allow the mobile terminal to use the current dedicated network if the moving speed received by the receiving module 51 is higher than or equal to a speed threshold.

The above speed threshold can be configured by an Operation Administration and Maintenance (OAM) system.

In the embodiment, if the moving speed reported by the mobile terminal is carried in the MSG3 in the random access procedure, a base station determines, after receiving the MSG3, whether the moving speed reported by the mobile terminal is higher than the speed threshold. If the moving speed of the mobile terminal is higher than or equal to the speed threshold, the access of the mobile terminal to the current dedicated network can be permitted through a fourth message (MSG4) in the random access procedure. If the moving speed reported by the mobile terminal is carried in the MSG5 in the random access procedure, it indicates that the base station has permitted the access of the mobile terminal in the initial access phase. If the moving speed of the mobile terminal is higher than or equal to the speed threshold, the mobile terminal is allowed to continue to use the current dedicated network.

In the embodiment, the base station allows the mobile terminal to use the current dedicated network in different ways by receiving the moving speed of the mobile terminal carried in different messages in the random access procedure, and implementation is flexible.

The refusing module 53 is configured to refuse the mobile terminal to use the current dedicated network if the moving speed received by the receiving module 51 is lower than the speed threshold.

In the embodiment, if the moving speed reported by the mobile terminal is carried in the MSG3 in the random access procedure, the base station determines, after receiving the MSG3, whether the moving speed reported by the mobile terminal is higher than the speed threshold. If the moving speed of the mobile terminal is lower than the speed threshold, the access of the mobile terminal to the current dedicated network can be refused through the MSG4 in the random access procedure. If the moving speed reported by the mobile terminal is carried in the MSG5 in the random access procedure, it indicates that the base station has permitted the access of the mobile terminal in the initial access phase. If the moving speed of the mobile terminal is lower than the speed threshold, the connection with the mobile terminal can be released through RRC Connection Release signaling, or the mobile terminal can be notified of accessible public network information through RRC Connection Release for reference by the mobile terminal.

In the embodiment, the base station refuses the mobile terminal to use the current dedicated network in different ways by receiving the moving speed of the mobile terminal carried in different messages in the random access procedure, and implementation is flexible.

According to the above embodiment, by receiving the moving speed reported by the mobile terminal, and comparing the moving speed with the speed threshold, the dedicated network can determine, according to a comparison result, whether the mobile terminal is a high-speed-railway mobile terminal or a general mobile terminal in an initial access phase of the mobile terminal, such that the mobile terminal accessing the dedicated network can be better managed, which avoids the situation that the communication quality of the high-speed-railway mobile terminal is influenced due to the fact that the general mobile terminal accesses the high-speed-railway dedicated network.

Figure 6:
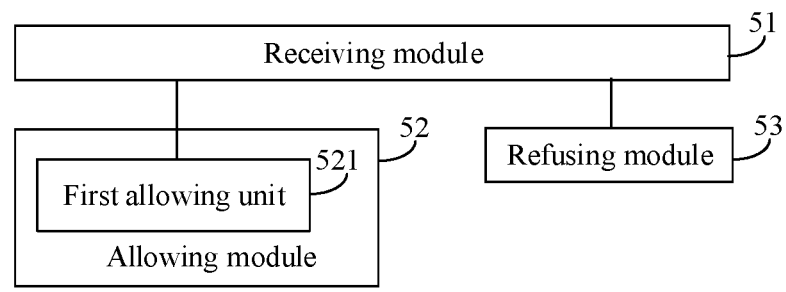
FIG. 6 is a block diagram of another device for controlling a mobile terminal to use a network according to an exemplary embodiment.

FIG. 6 is a block diagram of another device for controlling a mobile terminal to use a network according to an exemplary embodiment. As illustrated in FIG. 6, based on the above embodiment illustrated in FIG. 5, if the reported moving speed is carried in a third message in a random access procedure, the allowing module 52 may include a first allowing unit 521.

The first allowing unit 521 is configured to permit the mobile terminal to access the current dedicated network through a fourth message in the random access procedure.

In the embodiment, if the moving speed reported by the mobile terminal is carried in the MSG3 in the random access procedure, the base station determines, after receiving the MSG3, whether the moving speed reported by the mobile terminal is higher than the speed threshold. If the moving speed of the mobile terminal is higher than or equal to the speed threshold, the access of the mobile terminal to the current dedicated network can be permitted through the fourth message (MSG4) in the random access procedure.

According to the above embodiment, the access of the mobile terminal to the current dedicated network is permitted through the fourth message in the random access procedure, thus allowing the mobile terminal to use the current dedicated network, and implementation is flexible.

Figure 7:
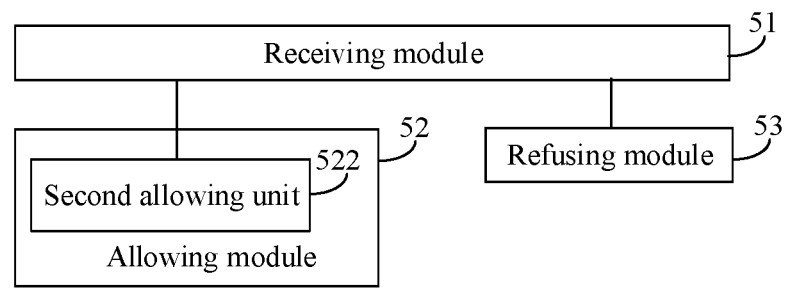
FIG. 7 is a block diagram of another device for controlling a mobile terminal to use a network according to an exemplary embodiment.

FIG. 7 is a block diagram of another device for controlling a mobile terminal to use a network according to an exemplary embodiment. As illustrated in FIG. 7, based on the above embodiment illustrated in FIG. 5, if the reported moving speed is carried in a fifth message in a random access procedure, the allowing module 52 may include a second allowing unit 522.

The second allowing unit 522 is configured to allow the mobile terminal to continue to use the current dedicated network.

If the moving speed reported by the mobile terminal is carried in the MSG5 in the random access procedure, it indicates that the base station has permitted the access of the mobile terminal in the initial access phase. If the moving speed of the mobile terminal is higher than or equal to the speed threshold, the mobile terminal is allowed to continue to use the current dedicated network.

According to the above embodiment, the access of the mobile terminal to the current dedicated network is allowed by allowing the mobile terminal to continue to use the current dedicated network, and implementation is flexible.

Figure 8:
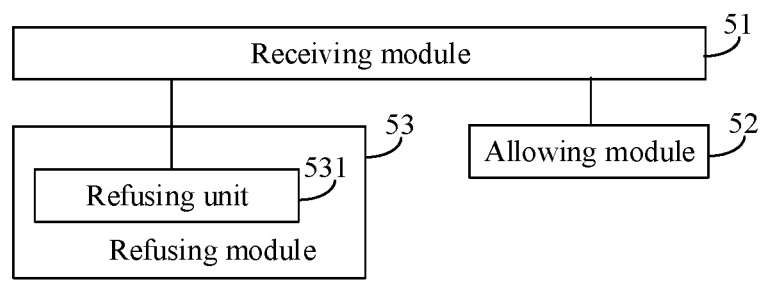
FIG. 8 is a block diagram of another device for controlling a mobile terminal to use a network according to an exemplary embodiment.

FIG. 8 is a block diagram of another device for controlling a mobile terminal to use a network according to an exemplary embodiment. As illustrated in FIG. 8, based on the above embodiment illustrated in FIG. 5, if the reported moving speed is carried in a third message in a random access procedure, the refusing module 53 may include an access refusing unit 531.

The access refusing unit 531 is configured to refuse, through a fourth message in the random access procedure, the mobile terminal to access the current dedicated network.

In the embodiment, if the moving speed reported by the mobile terminal is carried in the MSG3 in the random access procedure, the base station determines, after receiving the MSG3, whether the moving speed reported by the mobile terminal is higher than the speed threshold. If the moving speed of the mobile terminal is lower than the speed threshold, the access of the mobile terminal to the current dedicated network can be refused through the MSG4 in the random access procedure.

According to the above embodiment, the access of the mobile terminal to the current dedicated network is refused through the fourth message in the random access procedure, thus refusing the mobile terminal to use the current dedicated network, and implementation is flexible.

Figure 9:
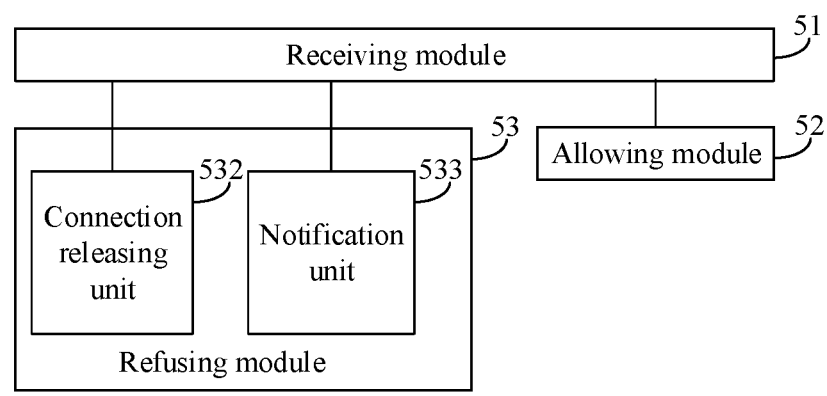
FIG. 9 is a block diagram of another device for controlling a mobile terminal to use a network according to an exemplary embodiment.

FIG. 9 is a block diagram of another device for controlling a mobile terminal to use a network according to an exemplary embodiment. As illustrated in FIG. 9, based on the above embodiment illustrated in FIG. 5, if the reported moving speed is carried in a fifth message in a random access procedure, the refusing module 53 may include a connection releasing unit 532 or a notification unit 533.

The connection releasing unit 532 is configured to release the connection with the mobile terminal through RRC connection release signaling.

The notification unit 533 is configured to notify the mobile terminal of accessible public network information through the RRC connection release signaling.

If the moving speed reported by the mobile terminal is carried in the MSG5 in the random access procedure, it indicates that the base station has permitted the access of the mobile terminal in the initial access phase. If the moving speed of the mobile terminal is lower than the speed threshold, the connection with the mobile terminal can be released through RRC Connection Release signaling, or the mobile terminal can be notified of accessible public network information through RRC Connection Release for reference by the mobile terminal.

According to the above embodiment, by releasing the connection with the mobile terminal through RRC connection release signaling or notifying the mobile terminal of accessible public network information through the RRC connection release signaling, the mobile terminal is refused to use the current dedicated network, and implementation is flexible.

Figure 10:
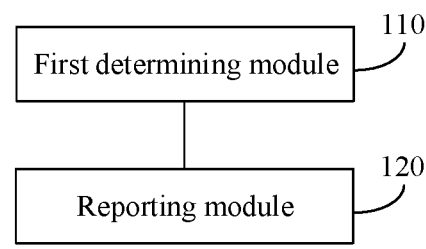
FIG. 10 is a block diagram of a device for reporting information according to an exemplary embodiment.

FIG. 10 is a block diagram of a device for reporting information according to an exemplary embodiment. The device may be located in a mobile terminal, and as illustrated in FIG. 10, the device includes a first determining module 110 and a reporting module 120.

The first determining module 110 is configured to determine that the mobile terminal needs to access a current dedicated network.

The reporting module 120 is configured to report a moving speed of the mobile terminal to a base station of the current dedicated network after the first determining module 110 determines that the mobile terminal needs to access the current dedicated network, such that the base station allows or refuses the mobile terminal to use the current dedicated network.

In the embodiment, when the mobile terminal needs to access a dedicated network, such as a high-speed-railway dedicated network, the mobile terminal may report its own moving speed in a random access procedure. For example, the mobile terminal may report its own moving speed in a third message (MSG3) or a fifth message (MSG5). After receiving the reported moving speed, the base station can compare the moving speed with a speed threshold. Then the base station allows the mobile terminal to use the current dedicated network when the moving speed is higher than or equal to the speed threshold, and refuses the mobile terminal to use the current dedicated network when the moving speed is lower than the speed threshold.

According to the above embodiment, by reporting the moving speed to the base station when it is determined that the mobile terminal needs to access the current dedicated network, the base station can compare, according to a comparison result, the moving speed with the speed threshold and determine whether the mobile terminal is a high-speed-railway mobile terminal or a general mobile terminal, such that the mobile terminal accessing the base station can be better managed, which avoids the situation that the communication quality of the high-speed-railway mobile terminal is influenced due to the fact that the general mobile terminal accesses the high-speed-railway dedicated network.

Figure 11:
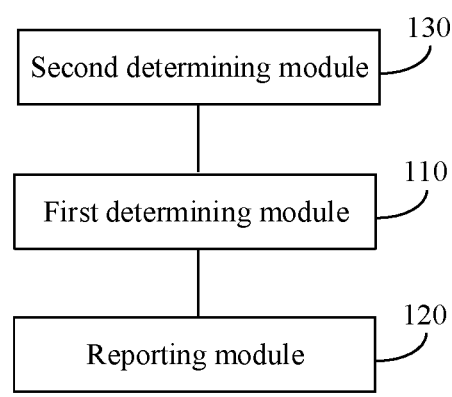
FIG. 11 is a block diagram of another device for reporting information according to an exemplary embodiment.

FIG. 11 is a block diagram of another device for reporting information according to an exemplary embodiment. As illustrated in FIG. 11, on the basis of the embodiment illustrated in FIG. 10, the device may further include a second determining module 130.

The second determining module 130 is configured to determine the moving speed of the mobile terminal before the reporting module 120 reports the moving speed of the mobile terminal to the base station of the current dedicated network.

Before accessing a dedicated network, for example, a high-speed-railway dedicated network, the mobile terminal needs to determine its own moving speed.

The moving speed of the mobile terminal may be obtained by GPS and other methods. The moving distance of the mobile terminal within a certain time period is measured, and the moving speed of the mobile terminal can be obtained by dividing the moving distance by the time period.

According to the above embodiment, by determining the moving speed of the mobile terminal, conditions are provided for subsequently reporting the moving speed of the mobile terminal to the base station.

Figure 12:
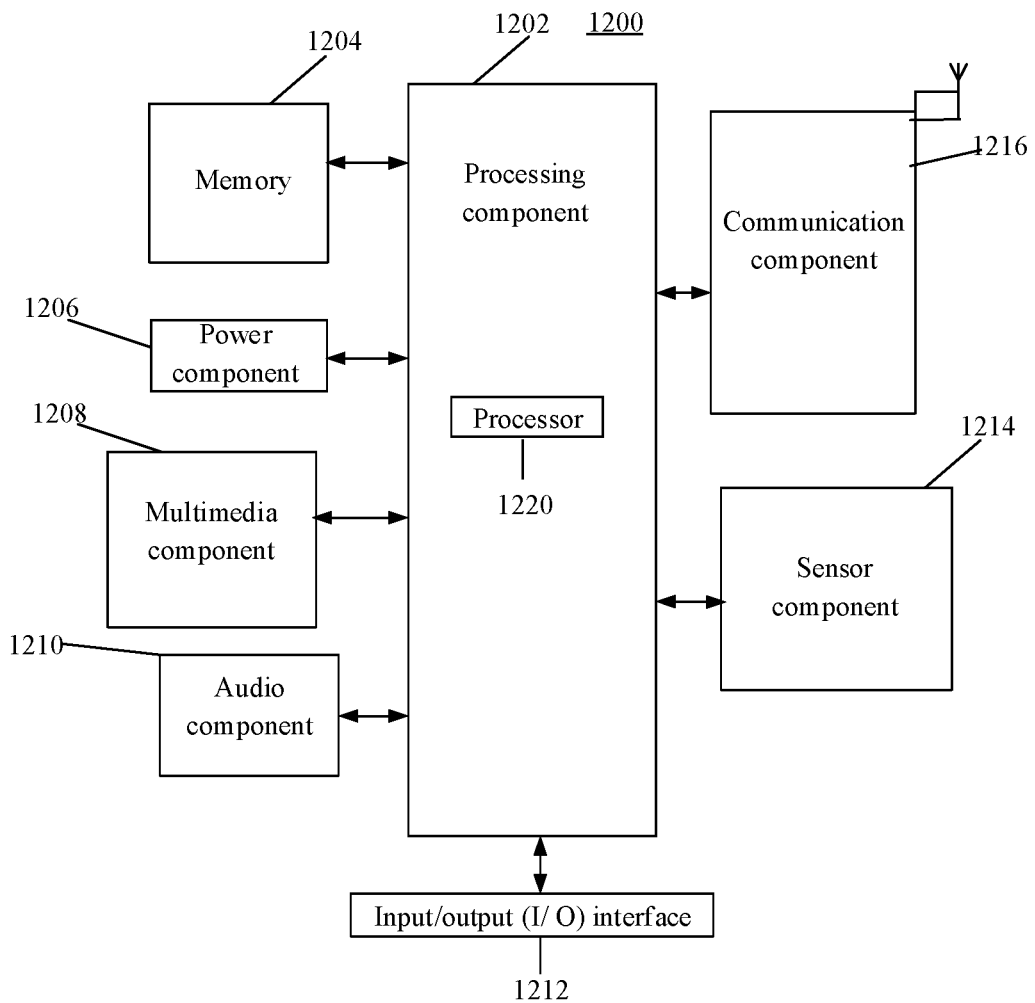
FIG. 12 is a block diagram of a device suitable for reporting information according to an exemplary embodiment.

FIG. 12 is a block diagram of a device for reporting information according to an exemplary embodiment. For example, the device 1200 may be user equipment such as a mobile phone, a computer, a digital broadcasting terminal, messaging equipment, a game console, tablet equipment, medical equipment, fitness equipment, and a personal digital assistant, etc.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls the overall operation of the device 1200, such as operations associated with display, telephone calls, data communication, camera operations, and recording operations. The processing component 1202 may include one or more processors 1220 to execute instructions, so as to complete all or part of the steps of the method described above. In addition, the processing component 1202 may include one or more modules to facilitate interaction between the processing component 1202 and other components. For example, the processing component 1202 may include a multimedia module to facilitate interaction between the multimedia component 1208 and the processing component 1202.

One of the processors 1220 in the processing component 1202 may be configured to:

determine that the mobile terminal needs to access a current dedicated network; and report a moving speed of a mobile terminal to a base station of the current dedicated network, such that the base station allows or refuses the mobile terminal to use the current dedicated network.

The memory 1204 is configured to store various types of data to support operations on the device 1200. Examples of such data include instructions for any application or method running on the device 1200, contact data, phone book data, messages, pictures, videos, etc. The memory 1204 may be implemented by any type of volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

The power component 1206 provides power for various components of the device 1200. The power component 1206 may include a power management system, one or more power supplies, and other components associated with generating, managing, and distributing power for the device 1200.

The multimedia component 1208 includes a screen which provides an output interface between the device 1200 and a user. In some embodiments, the screen may include a Liquid Crystal Display (LCD) and a Touch Panel (TP). If the screen includes a touch panel, the screen may be implemented as a touch screen so as to receive an input signal from the user. The touch panel includes one or more touch sensors to sense touch, sliding, and gestures on the touch panel. The touch sensor may not only sense the boundary of the touch or sliding, but also detect the duration and pressure related to the touch or sliding. In some embodiments, the multimedia component 1208 includes a front camera and/or a rear camera. When the device 1200 is in an operation mode, such as a shooting mode or a video mode, the front camera and/or the rear camera may receive external multimedia data. Each front camera and rear camera may be a fixed optical lens system or have a focal length and optical zoom capability.

The audio component 1210 is configured to output and/or input audio signals. For example, the audio component 1210 includes a microphone (MIC) which is configured to receive external audio signals when the device 1200 is in an operating mode, such as a call mode, a recording mode, and a voice recognition mode. The received audio signals may be further stored in the memory 1204 or transmitted via the communication component 1216. In some embodiments, the audio component 1210 further includes a speaker for outputting the audio signals.

The I/O interface 1212 provides an interface between the processing component 1202 and peripheral interface modules, which may be keyboards, click wheels, buttons, etc.

These buttons may include, but are not limited to, a home button, a volume button, a start button, and a lock button.

The sensor component 1214 includes one or more sensors configured to provide state evaluation for the device 1200 from various aspects. For example, the sensor component 1214 may detect the open/closed state of the device 1200, and the relative positioning of the components, such as a display and keypad of the device 1200; and the sensor component 1214 may also detect the position change of the device 1200 or a component of the device 1200, the presence or absence of user contact with the device 1200, the orientation or acceleration/deceleration of the device 1200, and the temperature change of the device 1200. The sensor component 1214 may include a proximity sensor configured to detect the presence of nearby objects without any physical contact. The sensor component 1214 may also include light sensors, such as CMOS or CCD image sensors, for use in imaging applications. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the device 1200 and other equipment. The device 1200 may access a wireless network based on a communication standard, such as Wi-Fi, 2G or 3G, or a combination thereof. In an exemplary embodiment, the communication component 1216 receives a broadcast signal or broadcast related information from an external broadcast management system via a broadcast channel. In an exemplary embodiment, the communication component 1216 further includes a Near Field Communication (NFC) module to facilitate short-range communication. For example, the NFC module can be implemented based on the Radio Frequency Identification (RFID) technology, the Infrared Data Association (IrDA) technology, the Ultra-Wideband (UWB) technology, the Bluetooth (BT) technology and other technologies.

In an exemplary embodiment, the device 1200 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements for performing the above-described methods.

In an exemplary embodiment, a non-transitory computer readable storage medium including instructions is provided, such as a memory 1204 including instructions, which can be executed by the processors 1220 of the device 1200 to complete the above method. For example, the non-transitory computer readable storage medium may be a ROM, a Random Access Memory (RAM), a CD-ROM, a magnetic tape, a floppy disk, an optical data storage device, etc.

Figure 13:
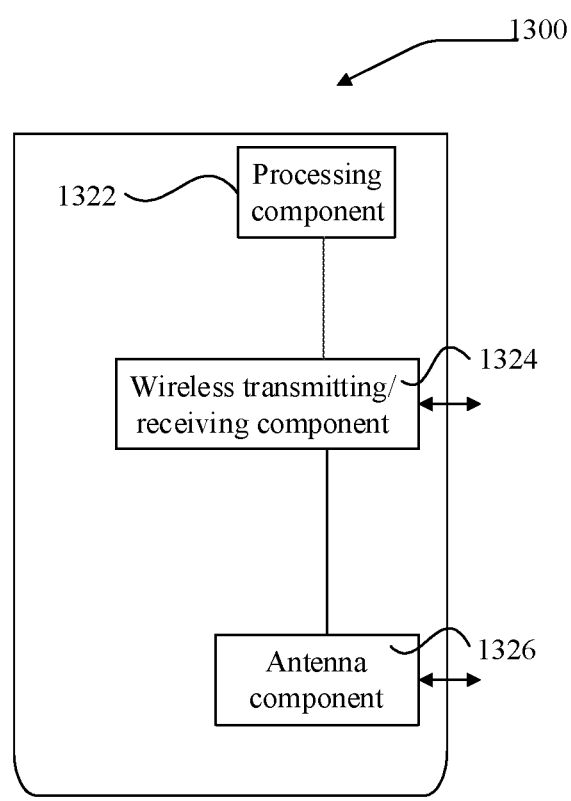
FIG. 13 is a block diagram of a device suitable for controlling a mobile terminal to use a network according to an exemplary embodiment.

FIG. 13 is a block diagram of a device for controlling a mobile terminal to use a network according to an exemplary embodiment. The device 1300 may be provided as a base station. Referring to FIG. 13, the device 1300 includes a processing component 1322, a wireless transmitting/receiving component 1324, an antenna component 1326, and a signal processing portion specific to a wireless interface. The processing component 1322 may further include one or more processors.

One of the processors in the processing component 1322 may be configured to:
receive a moving speed reported by a mobile terminal;
if the moving speed is higher than or equal to a speed threshold, allow the mobile terminal to use a current dedicated network; and
if the moving speed is lower than the speed threshold, refuse the mobile terminal to use the current dedicated network.

In an exemplary embodiment, there is also provided a non-transitory computer readable storage medium including instructions. The instructions are executable by the processing component 1322 of the device 1300 to complete the above method for controlling the mobile terminal to use the network. For example, the non-transitory computer readable storage medium may be a ROM, a Random Access Memory (RAM), a CD-ROM, a magnetic tape, a floppy disk, an optical data storage device, etc.

For device embodiments, since they basically correspond to the method embodiments, please refer to the description of the method embodiments for relevant information. The device embodiments described above are only schematic, wherein the units described as separate components may or may not be physically separated, and the components displayed as units may or may not be physical units, i.e., may be located in one place or may be distributed over multiple network units. Some or all of the modules may be selected according to actual needs to achieve the purpose of the present embodiment. One of ordinary skill in the art can understand and implement it without creative labor.

It is to be noted that herein, relational terms such as first and second are only used to distinguish one entity or operation from another entity or operation, and do not necessarily require or imply any such actual relationship or order between these entities or operations. The term "include" or any other variation thereof, is intended to cover a non-exclusive inclusion, such that a process, method, article, or device which includes a list of elements does not include only those elements but also other elements not expressly listed or inherent to such process, method, article, or device. Without further limitation, an element defined by the statement "includes a . . . " does not exclude the presence of another identical element in a process, method, article or device that includes the element.

Other embodiments of the disclosure will readily occur to those skilled in the art upon consideration of the specification and practice of the disclosure disclosed herein. The present application is intended to cover any variation, use or adaptation of the disclosure, which follows the general principles of the disclosure and includes common knowledge or conventional technical means in the technical field not disclosed in the disclosure. The specification and embodiments are to be considered as exemplary only, with the true scope and spirit of the disclosure being indicated by the following claims.

It is to be understood that the disclosure is not limited to the precise structure already described above and shown in the drawings, and various modifications and changes may be made without departing from the scope thereof. The scope of the disclosure is limited only by the appended claims.

The invention claimed is:

1. A method for controlling a mobile terminal to use a network, applying to a base station, the method comprising:
receiving a moving speed reported by the mobile terminal; and
when the moving speed is higher than or equal to a speed threshold, allowing the mobile terminal to use a current dedicated network; or when the moving speed is lower than the speed threshold, refusing the mobile terminal to use the current dedicated network;

wherein the base station allows or refuses the mobile terminal to use the current dedicated network in different ways by receiving the moving speed of the mobile terminal carried in different messages in a random access procedure;

wherein the network is a dedicated network for mobile terminals moving faster than the speed threshold, and the dedicated network is configured to determine, based on a comparison result, whether the mobile terminal is a high-speed-moving mobile terminal or a general mobile terminal in an initial access phase of the mobile terminal, such that the mobile terminal accessing the dedicated network is managed to avoid communication quality of the high-speed-moving mobile terminal being affected due to that the general mobile terminal attempts to access the dedicated network.

2. The method of claim 1, wherein when the moving speed is carried in a third message in a random access procedure, allowing the mobile terminal to use the current dedicated network comprises:

permitting the mobile terminal to access the current dedicated network through a fourth message in the random access procedure.

3. The method of claim 1, wherein when the moving speed is carried in a fifth message in a random access procedure, allowing the mobile terminal to use the current dedicated network comprises:

allowing the mobile terminal to continue to use the current dedicated network.

4. The method of claim 1, wherein when the moving speed is carried in a third message in a random access procedure, refusing the mobile terminal to use the current dedicated network comprises:

refusing the mobile terminal to access the current dedicated network through a fourth message in the random access procedure.

5. The method of claim 1, wherein when the moving speed is carried in a fifth message in a random access procedure, refusing the mobile terminal to use the current dedicated network comprises:

releasing a connection with the mobile terminal through radio resource control (RRC) connection release signaling; or notifying the mobile terminal of accessible public network information through the RRC connection release signaling.

6. The method of claim 1, wherein the speed threshold is configured by an Operation Administration and Maintenance (OAM) system.

7. A method for reporting information, applying to a mobile terminal, the method comprising:

determining that the mobile terminal needs to access a current dedicated network; and reporting a moving speed of the mobile terminal to a base station of the current dedicated network, such that the base station allows or refuses the mobile terminal to use the current dedicated network;

wherein the base station allows or refuses the mobile terminal to use the current dedicated network in different ways by receiving the moving speed of the mobile terminal carried in different messages in a random access procedure;

wherein a dedicated network is used for mobile terminals moving faster than the speed threshold, and the dedicated network is configured to determine, based on a comparison result, whether the mobile terminal is a high-speed-moving mobile terminal or a general mobile terminal in an initial access phase of the mobile terminal, such that the mobile terminal accessing the dedicated network is managed to avoid communication quality of the high-speed-moving mobile terminal being affected due to that the general mobile terminal attempts to access the dedicated network.

8. The method of claim 7, wherein the method further comprises:

determining the moving speed of the mobile terminal before reporting the moving speed of the mobile terminal to the base station of the current dedicated network.

9. The method of claim 7, wherein reporting the moving speed of the mobile terminal to the base station of the current dedicated network comprises:

reporting the moving speed to the base station of the current dedicated network through a third message in a random access procedure or a fifth message in the random access procedure.

10. A base station, comprising:

a processor; and a memory device configured to store instructions executable by the processor, wherein the processor is configured to:

receive a moving speed reported by the mobile terminal;

allow the mobile terminal to use a current dedicated network when the moving speed is higher than or equal to a speed threshold; and refuse the mobile terminal to use the current dedicated network when the moving speed is lower than the speed threshold;

wherein the base station allows or refuses the mobile terminal to use the current dedicated network in different ways by receiving the moving speed of the mobile terminal carried in different messages in a random access procedure;

wherein a dedicated network is used for mobile terminals moving faster than the speed threshold, and the dedicated network is configured to determine, based on a comparison result, whether the mobile terminal is a high-speed-moving mobile terminal or a general mobile terminal in an initial access phase of the mobile terminal, such that the mobile terminal accessing the dedicated network is managed to avoid communication quality of the high-speed-moving mobile terminal being affected due to that the general mobile terminal attempts to access the dedicated network.

11. The base station of claim 10, wherein when the moving speed is carried in a third message in a random access procedure, the processor is further configured to:

permit the mobile terminal to access the current dedicated network through a fourth message in the random access procedure.

12. The base station of claim 10, wherein when the moving speed is carried in a fifth message in a random access procedure, the processor is further configured to:

allow the mobile terminal to continue to use the current dedicated network.

13. The base station of claim 10, wherein when the moving speed is carried in a third message in a random access procedure, the processor is further configured to:

refuse the mobile terminal to access the current dedicated network through a fourth message in the random access procedure.

14. The base station of claim 10, wherein when the moving speed is carried in a fifth message in a random access procedure, the processor is further configured to:
    release a connection with the mobile terminal through radio resource control (RRC) connection release signaling; or
    notify the mobile terminal of accessible public network information through the RRC connection release signaling.

15. The base station of claim 10, wherein the speed threshold is configured by an Operation Administration and Maintenance (OAM) system.

16. A mobile terminal, comprising:
    a processor; and a memory device storing instructions for execution by the processor to implement steps of the method for reporting information according to claim 7.

17. A communication system, comprising a base station configured to: receive a moving speed reported by a mobile terminal; and when the moving speed is higher than or equal to a speed threshold, allow the mobile terminal to use a current dedicated network; or when the moving speed is lower than the speed threshold, refuse the mobile terminal to use the current dedicated network; wherein the base station allows or refuses the mobile terminal to use the current dedicated network in different ways by receiving the moving speed of the mobile terminal carried in different messages in a random access procedure; wherein the network is a dedicated network for mobile terminals moving faster than the speed threshold, and the dedicated network is configured to determine, based on a comparison result, whether the mobile terminal is a high-speed-moving mobile terminal or a general mobile terminal in an initial access phase of the mobile terminal, such that the mobile terminal accessing the dedicated network is managed to avoid communication quality of the high-speed-moving mobile terminal being affected due to that the general mobile terminal attempts to access the dedicated network; and wherein the dedicated network is a high-speed-railway dedicated network.

18. The communication system of claim 17, further comprising a plurality of mobile terminals moving faster than the speed threshold.

\* \* \* \* \*